United States Patent
Pagan et al.

(10) Patent No.: US 10,834,904 B2
(45) Date of Patent: Nov. 17, 2020

(54) RETRACTABLE LEASH WITH INTEGRATED LOCKING SYSTEM

(71) Applicants: Joshua Pagan, Orlando, FL (US); Sarah Bordua, Orlando, FL (US)

(72) Inventors: Joshua Pagan, Orlando, FL (US); Sarah Bordua, Orlando, FL (US)

(73) Assignee: Leash Lock LLC, New Smyrna Beach, FL (US)

( * ) Notice: Subject to any disclaimer, the term of this patent is extended or adjusted under 35 U.S.C. 154(b) by 0 days.

(21) Appl. No.: 16/800,664

(22) Filed: Feb. 25, 2020

(65) Prior Publication Data
US 2020/0267937 A1    Aug. 27, 2020

Related U.S. Application Data

(60) Provisional application No. 62/811,247, filed on Feb. 27, 2019.

(51) Int. Cl.
*A01K 27/00* (2006.01)
*B65H 75/44* (2006.01)

(52) U.S. Cl.
CPC ....... *A01K 27/004* (2013.01); *B65H 75/4431* (2013.01)

(58) Field of Classification Search
CPC .... A01K 27/00; A01K 27/004; A01K 27/006; A01K 27/009
USPC ................ 119/712, 769, 791–796, 772, 770
See application file for complete search history.

(56) References Cited

U.S. PATENT DOCUMENTS

| | | | |
|---|---|---|---|
| 6,243,039 B1 | 6/2001 | Elliot | |
| 6,694,922 B2 | 2/2004 | Walter et al. | |
| 2008/0042000 A1* | 2/2008 | Horton | A45F 5/004 242/382 |
| 2008/0105214 A1* | 5/2008 | Moulton | A01K 27/004 119/796 |
| 2011/0083617 A1* | 4/2011 | Townsend | A01K 1/04 119/797 |
| 2015/0075447 A1* | 3/2015 | Chefetz | A01K 27/004 119/796 |
| 2015/0128879 A1* | 5/2015 | Anderson | A01K 27/004 119/796 |
| 2016/0143253 A1* | 5/2016 | Pawlowski | A01K 27/004 119/796 |
| 2016/0157466 A1* | 6/2016 | Gunn | A01K 27/006 119/797 |

* cited by examiner

*Primary Examiner* — Richard T Price, Jr.
(74) *Attorney, Agent, or Firm* — Jason T. Daniel, Esq.; Daniel Law Offices, P.A.

(57) ABSTRACT

A retractable leash with integrated locking system includes a main body having a plurality of sides that define an interior space. An elongated leash cord extends through an aperture in the main body and is connected to a retractable mechanism that is positioned within the main body. A locking handle assembly is connected to the main body and transitions between an open position and a closed position. The handle assembly includes a fixed section and a movable section that is hingedly secured to the main body. An electronic lock is positioned within the handle assembly and is selectively activated by a biometric sensor. A location module is positioned within the main body, and a light and charging port are positioned along the main body.

11 Claims, 6 Drawing Sheets

RETRACTABLE LEASH WITH INTEGRATED LOCKING SYSTEM

CROSS-REFERENCE TO RELATED APPLICATIONS

This application claims the benefit of U.S. Application Ser. No. 62/811,247 filed on Feb. 27, 2019, the contents of which are incorporated herein by reference.

TECHNICAL FIELD

The present invention relates generally to animal restraint devices, and more particularly to a retractable leash having an integrated locking system.

BACKGROUND

The statements in this section merely provide background information related to the present disclosure and may not constitute prior art.

Pet owners typically enjoy walking, jogging, running, and the like with their canine friends for accompaniment and exercise. In recent years, many businesses such as outdoor restaurants, bars and coffee shops, for example, have become increasingly pet friendly, thus allowing pet owners to enjoy ever increasing activities with their pets. As such, most such establishments maintain a strict pet leash policy, as do virtually all state parks and other such locations. To this end, there are no shortage of commercially available leash devices. Among these, the most popular leashes are retractable in nature, so as to allow the pet owner to vary the amount of space the pet is able to move away from the leash handle.

Although these devices are useful for their intended purpose, many pet owners encounter a practical problem with their use. More specifically, pet owners have a tendency to struggle with what to do with their leashed pet when they need to use their hands. In many instances, pet owners will attempt to secure the leash onto a chair or other such item so as to regain the ability to use both hands for a short or extended period of time. Unfortunately, this approach often fails as the leash becomes separated from the chair, and the animal runs away.

Accordingly, it would be beneficial to provide a pet leash having an integrated locking mechanism that can be quickly and easily secured onto any number of secondary objects with one hand.

SUMMARY OF THE INVENTION

The present invention is directed to a retractable leash with integrated locking system. One embodiment of the present invention can include a main body having a plurality of sides that define an interior space. An elongated leash cord can extend through an aperture in the main body and can be connected to a retractable mechanism that is positioned within the main body. A locking handle assembly can be connected to the main body, and can transition between an open position and a closed position.

In one embodiment, the handle assembly can include a movable section for providing access to a central opening formed by the handle segments. The movable section can move into the central opening, to form a gap for receiving a secondary object. The movable handle section can be hingedly secured to the main body and can be biased toward a closed position wherein the fixed and movable handle sections are connected.

In one embodiment, an electronic lock can be positioned within the handle assembly and can be selectively activated by a biometric sensor.

In one embodiment, a location module can be positioned within the main body and can include functionality for allowing a user to identify a location and previous movements of the leash system.

In one embodiment, the leash system can include a light, a battery and a charging port.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the terms "connector" and "complementary connector" include any number of different elements that work together to repeatedly join two items together in a nonpermanent manner. Several nonlimiting examples include opposing strips of hook and loop material (i.e. Velcro®), attractively-oriented magnetic elements, tethers, buckles and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "pivotally connected" "rotatably secured" and derivatives thereof shall be used interchangeably to describe a situation wherein two identified objects are joined together in a manner that allows one or both of the objects to move, pivot, and/or rotate about or in relation to the other object in a horizontal and/or vertical manner. Several nonlimiting examples of components for pivotally connecting objects together include hinge mechanisms, spring loaded hinge mechanisms, ball joint couplers, and/or swivel flanges, for example.

FIGS. 1-6 illustrate various embodiments of a retractable leash with integrated locking system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Although described throughout this document as including a retractable leash for use with a pet, this is for illustrative purposes only. To this end, the inventive device can be used for any number of other purposes and may include variants wherein the length of the leash is not adjustable. Moreover, alternate embodiments are contemplated wherein multiple tethers/leash lines can extend from the main body, so as to function with multiple animals at once.

Figure 1:
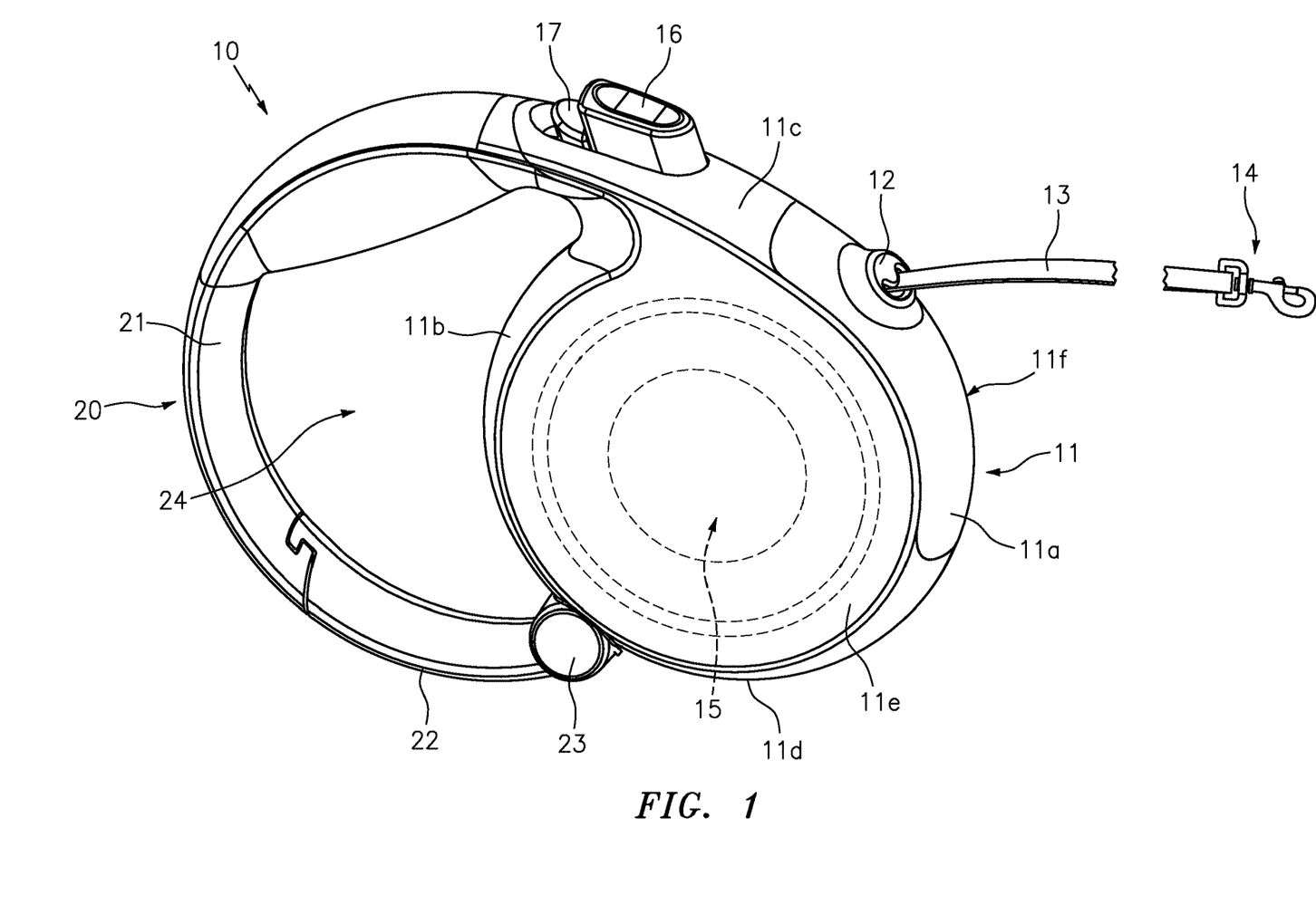
FIG. 1 is a perspective view of one embodiment of a retractable leash with integrated locking system that is useful for understanding the inventive concepts disclosed herein.
Figure 2:
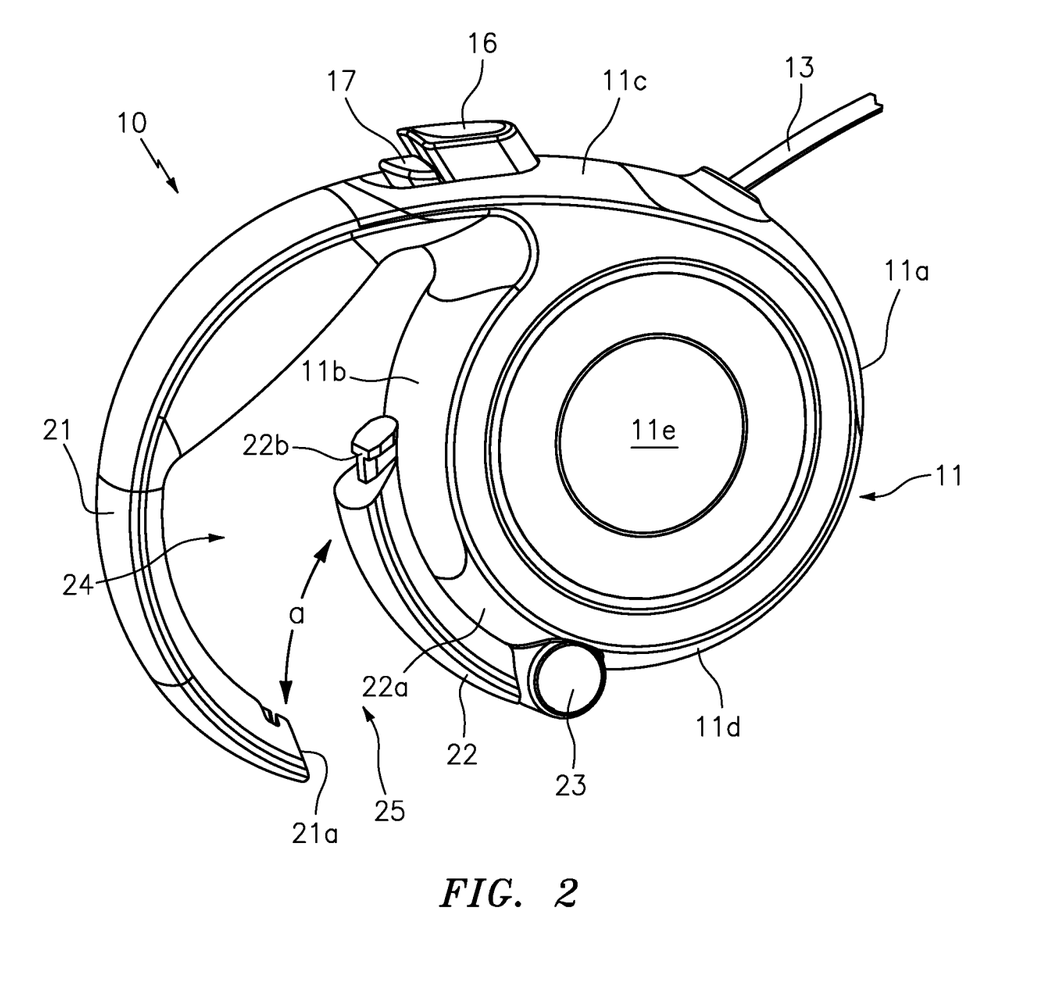
FIG. 2 is a side view of the retractable leash with integrated locking system, in accordance with one embodiment of the invention.

As shown in FIGS. 1 and 2, one embodiment of the leash system 10 can include, essentially, a main body 11, an elongated leash cord 13, a retractable mechanism 15, and a locking handle assembly 20.

The main body can function to house the system components and can include a front end 11a, a back end 11b, a top end 11c, a bottom end 11d and a pair of opposing sides 11e and 11f that define a generally hollow interior space. In the preferred embodiment, the main body can include the illustrated curvilinear shape and can be constructed from plastic having a plurality of internally located tabs (not illustrated) for engaging and securing the retractable mechanism 15.

Of course, the main body is not limited to such a shape, as any number of other shapes are also contemplated. Moreover, the main body may be formed from any number of different materials that are, for example, relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

In one embodiment, an aperture 12 can be positioned along the main body 11 through which the leash cord 13 can pass. As described herein, the leash cord 13 can include any number of different lengths, and can be constructed from any number of different materials suitable for restraining an animal. In one embodiment, the cord can be constructed from double-stitched nylon or polyester, for example, which is known to be resilient and have high tensile strength.

A clip 14 such as a swivel bolt snap hook, for example, can be positioned along a distal end of the tether and can function in the expected manner to engage a collar of an animal. Of course, any number of other known items capable of selectively coupling to an animal leash are also contemplated for use herein.

In the preferred embodiment, the leash cord 13 can be secured to an internally located retractable mechanism 15 having an actuator 16 such as a button, for example, that inhibits the leash cord from extending or retracting when engaged. A dual position switch 17 can be provided along the main body and can function to selectively lock the actuator 16 in an actuated position, and/or to enable the actuator to operate freely.

Retractable leash mechanisms are well known in the art, and typically include a biased spring spool assembly. One suitable example of such an assembly is described in U.S. Pat. No. 6,694,922, to Walter, the contents of which are incorporated herein by reference. Of course, any number of other such mechanisms for operating the leash are also contemplated.

In one embodiment, a locking handle assembly 20 can be connected to the main body 11 and can function to transition between the closed position shown at FIG. 1 and the open position shown at FIG. 2.

In one nonlimiting embodiment, the handle assembly 20 can include a fixed handle section 21 that extends outward from the top end of the main body 11c, and a movable handle section 22 that is rotatably secured to the bottom end of the main body 11d by a hinge 23. In one embodiment, the fixed handle section can include a recession 21a having a shape and size that is complementary to a protrusion 22a located along the movable handle. The recession and protrusion joining together to form a solid shape when the handle is in the closed position. Of course, any number of other connectors can be used to removably secure the handle sections in the closed position.

In the closed position, the handle assembly 20 forms a generally semi-circular shaped central opening 24 that is bordered on all sides by the fixed handle section 21, the movable handle section 22 and the back end of the main body 11b. As will be described below, this central opening 24 can be used by an operator's hand when holding the handle, and can encompass a portion of a secondary item to which the leash system 10 is secured.

As shown best at FIG. 2, the hinge 23 can rotate (see arrow a) the movable handle section 22 into the central opening 24 so as to create a gap 25 in the handle through which any number of secondary items can pass through. In one embodiment, the inside surface 22a of the movable handle can include a curved shape that is complementary to the curved shape of the back end 11b, so as to allow the surfaces to be in contact along an entirety of the length of the movable handle section. Such a feature ensures the width of the gap 25 is as large as possible.

In the preferred embodiment, the hinge 23 can include, comprise or consist of a spring-loaded hinge, or other known mechanism capable of applying a biasing force onto the movable handle section 22. The biasing force being directed toward the fixed handle section 21, so as to automatically transition the handle assembly from the open position to the closed position, and to maintain the handle in the closed position unless acted upon by an outside force.

Figure 3:
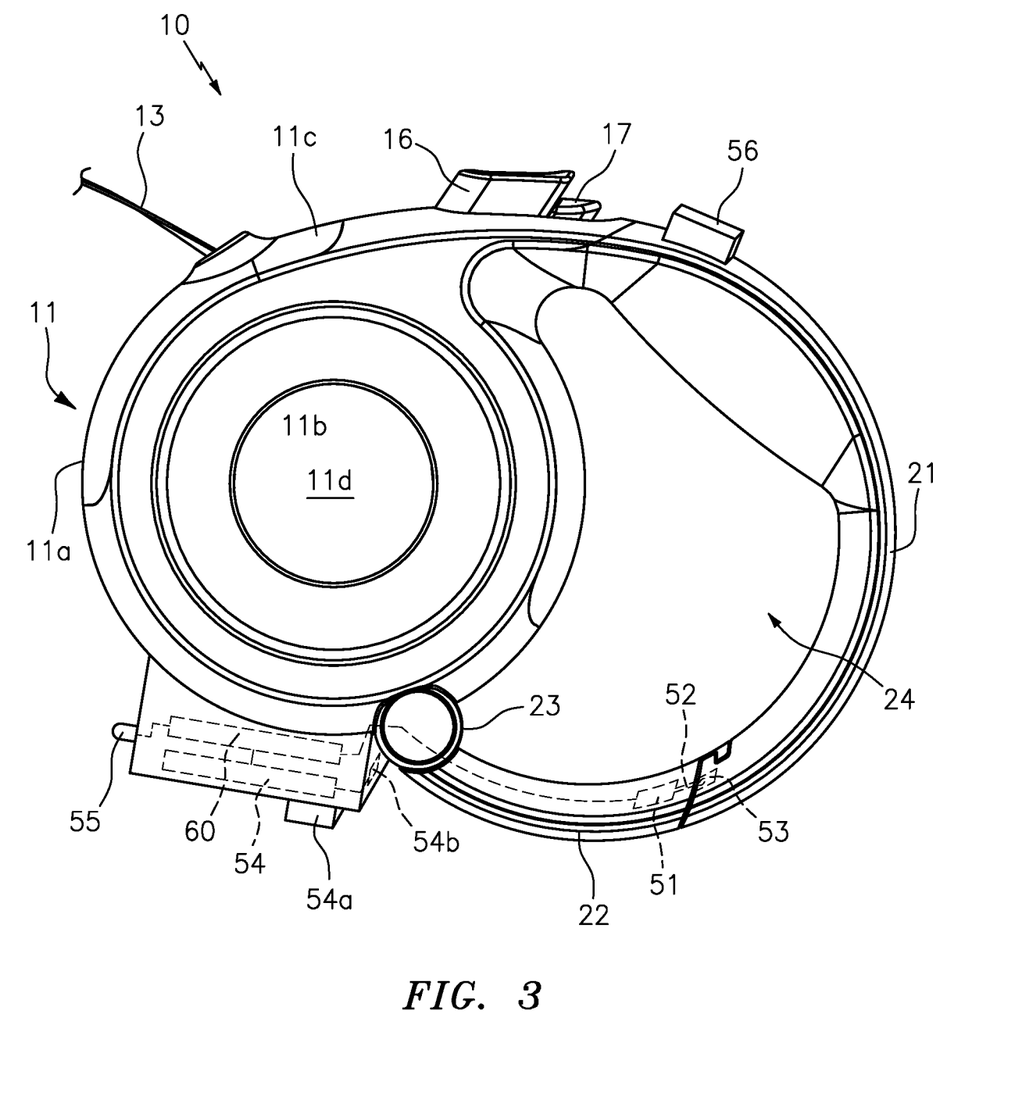
FIG. 3 is another side view of the retractable leash with integrated locking system, in accordance with one embodiment of the invention.

Although described above as including purely mechanical components, the inventive concepts are not so limiting. To this end, FIG. 3 illustrates one embodiment of the retractable leash with integrated locking system 10 that further includes an electromechanical lock 51, a power source 54, a light 55, and a user verification sensor 56 that are in communication with a controller 60.

In the illustrated embodiment, an electric lock 51 such as a linear actuator, for example, can be positioned within the movable handle section 22 and can function to selectively lock the handle sections in the closed position. As shown, the lock can include a rod 52 that can extend within an aperture 53 located along the distal end of the fixed handle section. As such, when the rod is in the extended position, the rod prevents movement of the handle section 22.

The power source 54 can preferably include one or more DC batteries capable of providing the necessary power requirements to each element of the device 10. In one embodiment, the batteries can be permanently located within the main body and can be rechargeable in nature via a first charging port 54a. Likewise, the onboard battery can be configured so as to charge other devices such as a user smartphone, for example, via a second charging port 54b such as a mini or micro USB port, for example. Of course, traditional batteries can also be utilized and the main body 11 can further include a battery compartment having a removable cover (not illustrated) for allowing a user to access the same.

In the preferred embodiment, the light 55 can include one or more Light Emitting Diodes that can be positioned along the main body 11 and selectively activated by the below described controller, a switch or other such component.

The user verification sensor 56 can function to verify a user identity based on stored data. In one embodiment, the sensor 56 can include a fingerprint sensor that is communicatively linked to the controller. As is known in the art, fingerprint sensors can capture an image of a fingerprint and compare the captured image to those stored within a system memory. Next, the system processor can compare the captured image with the stored image to authenticate the user. In the present system, the sensor can be used to selectively operate the electric lock, so as to only allow an authorized user to transition the handle from the closed position to the open position.

Figure 4:
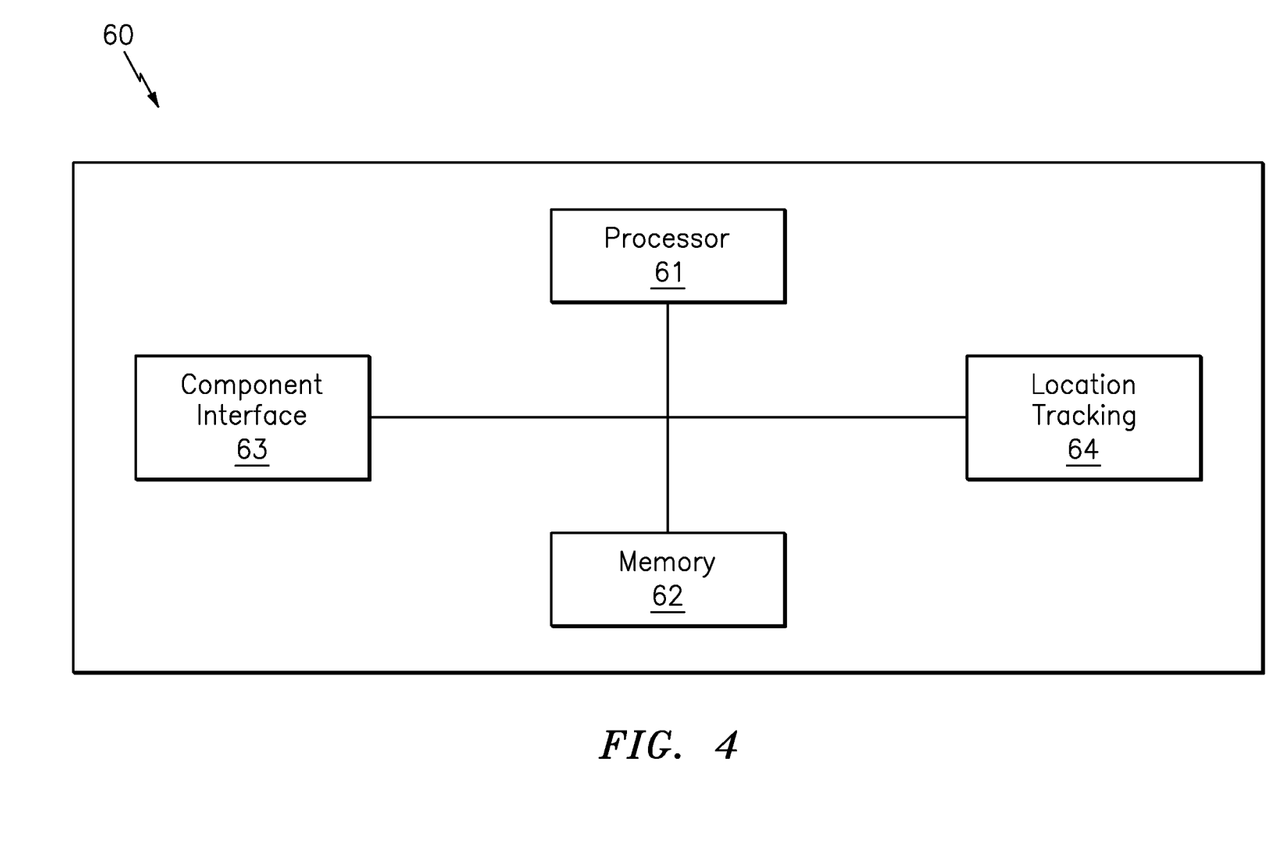
FIG. 4 is a simplistic block diagram illustrating a controller of the retractable leash with integrated locking system, in accordance with one embodiment of the invention.

FIG. 4 illustrates one embodiment of the controller 60 that includes a processor 61 that is conventionally connected to an internal memory 62, a component interface unit 63 and a location tracking module 64. Although illustrated as separate elements, those of skill in the art will recognize that one or more system components may comprise, or include one or more printed circuit boards (PCB) containing any number of integrated circuit or circuits for completing the activities described herein.

Of course, any number of other analog and/or digital components capable of performing the below described functionality can be provided in place of, or in conjunction with the below described controller elements.

The processing unit 61 can be a conventional central processing unit (CPU) or any other type of device, or multiple devices, capable of manipulating or processing information such as program code stored in the memory 62 and for causing the circuitry to complete the activities and functionality described herein.

Memory 62 can act to store operating instructions in the form of program code for the processor 61 to execute. Although illustrated in FIG. 4 as a single component, memory 62 can include one or more physical memory devices such as, for example, local memory and/or one or more bulk storage devices.

The component interface unit 63 can function to provide a communicative link between the processor 61 and various other device components such as the electric lock 51, the charging port 54a-54b and/or the light 55, for example. In this regard, the component interface unit can include any number of different components such as one or more PIC microcontrollers, internal bus, USB connections and other such hardware capable of providing a direct link between the various components. Of course, any other means for providing the two-way communication between the identified components can also be utilized herein.

In one embodiment, the device can further include a location tracking module 64 which can be used to allow a user to remotely locate the location of the leash 10. Such a feature being beneficial for tracking lost or stolen devices, and to verify a pet watcher is walking the animal as instructed.

In the preferred embodiment, the locator module can include a cellular transceiver capable of utilizing cellular tower triangulation, and/or can include a GPS signal antenna. One example of a GPS location module and associated system for tracking the same can be found in U.S. Pat. No. 6,243,039, to Elliot, the contents of which are incorporated herein by reference.

In operation, the retractable leash with integrated locking system 10 can be used in the traditional way to walk an animal whereby the clip of the leash can be secured to the collar of an animal 1, and a user can grip the handle assembly 20 with one hand and selectively operate the retractable mechanism 15 via the actuator 16. During this time, the user may selectively activate the light 55 and/or may charge their phone or other device via the charging port 54b.

Figure 5:
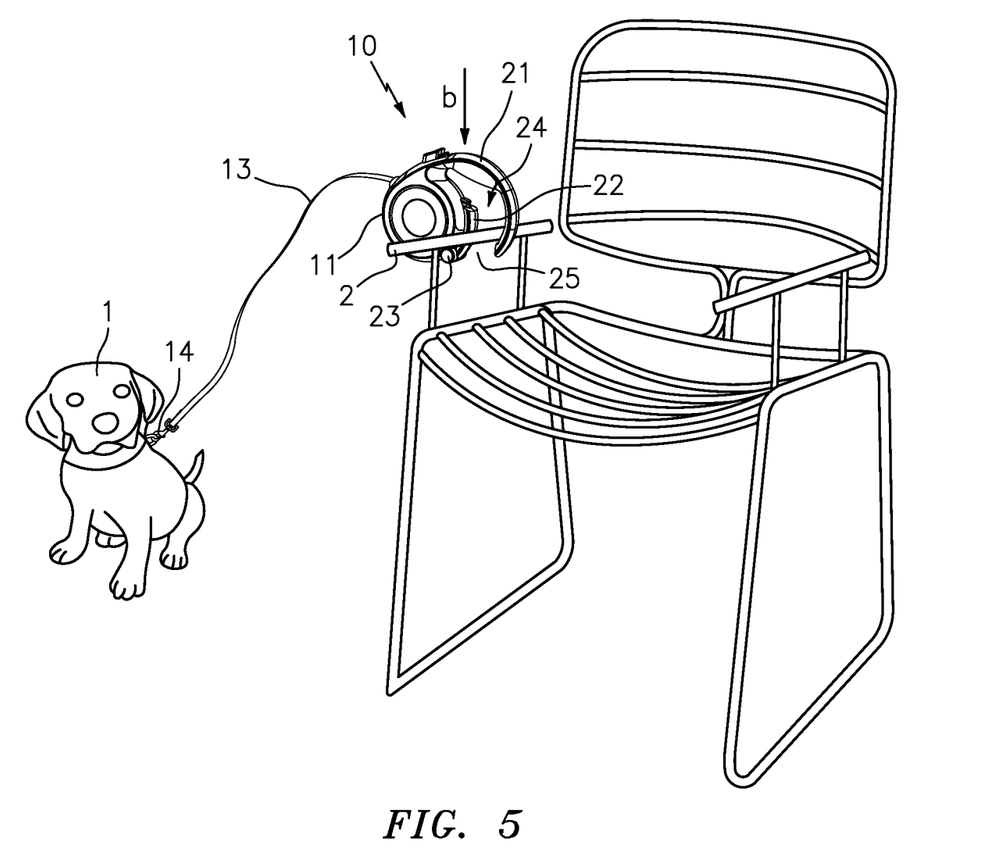
FIG. 5 is a perspective view of the retractable leash with integrated locking system in operation in the open position, in accordance with one embodiment of the invention.
Figure 6:
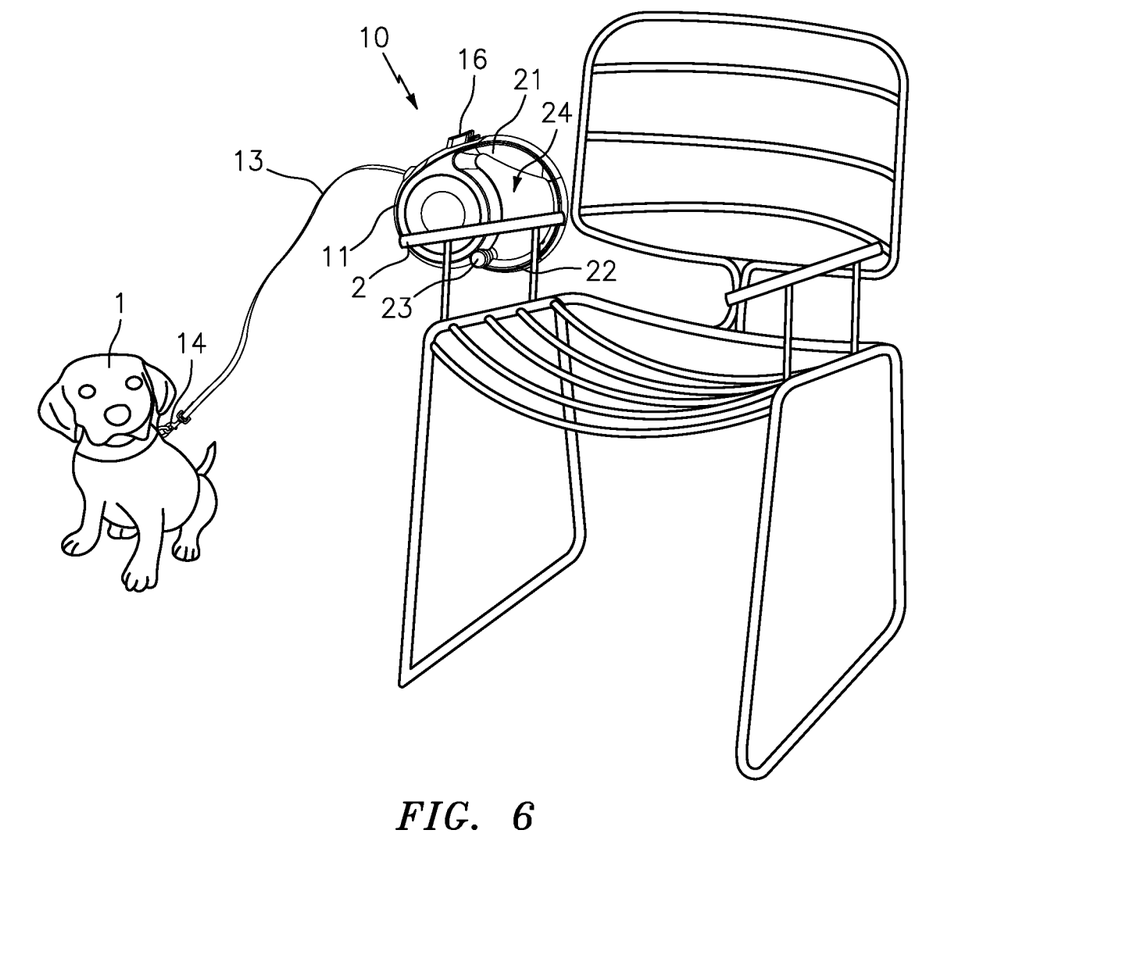
FIG. 6 is a perspective view of the retractable leash with integrated locking system in operation in the closed position, in accordance with one embodiment of the invention.

FIGS. 5 and 6 illustrate one embodiment of the locking handle assembly of the retractable leash system 10 in operation. As shown, a user can simply position the movable handle section 22 against a secondary object 2 such as the arm of a chair, for example, and press the handle toward the object (see arrow b).

The pressing force causes the movable arm 22 to open, thus creating the gap 25 through which the object 2 passes on its way to the handle opening 24. Upon passing the tip of the protrusion 24a, the bias imposed by the hinge 23 will automatically transition the movable handle section to the closed position, thus causing the object to be encompassed within the opening 24.

Because the movable handle opens inward, the system is advantageously adapted for easy one hand use when securing the leash to the object. Moreover, if/when the animal attempts to run away, the pulling force applied by the animal acts to further secure the handle in the closed position.

When removing the leash from the object, the user can simply transition the movable arm 22 to the open position and lift the handle away from the object. In systems equipped with the sensor 56, the user's biometrics will need to be verified as described above before the lock will retract to permit movement.

Accordingly, the retractable leash with integrated locking system 10 provides an innovative and novel solution for allowing users to quickly and easily secure their leash and pet onto any number of secondary objects.

As described herein, one or more elements of the system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it can inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A leash system, comprising:
a main body having a plurality of sides that define an interior space;
a retractable mechanism that is positioned within the interior space;
an elongated leash cord that is in communication with the retractable mechanism, said leash cord extending outward from the main body;
a locking handle assembly that is in communication with the main body, said assembly being configured to transition between an open position and a closed position; wherein the locking handle assembly comprises a fixed handle section having a first end that is in communication with the main body, wherein the locking handle assembly comprises a movable handle section that is in communication with the main body and is selectively connected to the fixed handle; and
a central opening that is formed by the fixed handle section, the movable handle section and a portion of the main body,
wherein in the closed position, the movable handle section is connected to the fixed handle section,
wherein in the open position, a gap is located between the fixed handle section and the movable handle section,
wherein the movable handle section comprises an inside surface having a curved shape,
wherein the portion of the main body comprises a surface having a curved shape that is complimentary to the curved shape of the inside surface of the movable handle section,
wherein the curved shape of the portion of the main body is in contact with the inside surface of the movable handle section along an entirety of a length of the movable handle section when in open position.

2. The system of claim 1, wherein said gap provides a pathway for accessing the central opening.

3. The system of claim 1, further comprising:
a hinge that is positioned between the movable handle section and the main body.

4. The system of claim 3, wherein the hinge includes a biasing force that transitions the handle assembly from the open position to the closed position.

5. The system of claim 1, further comprising:
an actuator that is positioned along the main body, said actuator being configured to inhibit a movement of the retractable mechanism.

6. The system of claim 5, further comprising:
a switch that is in communication with the actuator, said switch functioning to selectively lock the actuator in an actuated position.

7. The system of claim 1, further comprising:
a battery that is positioned within the main body; and
a light that is positioned along an exterior of the main body.

8. The system of claim 1, further comprising:
a lock along the movable handle section, the lock functioning to selectively lock the movable handle section with the fixed handle section when in the closed position.

9. The system of claim 8, further comprising an aperture within the fixed handle section, wherein the lock comprises a rod configured to extend into the aperture to prevent movement of the movable handle section.

10. The system of claim 9, further comprising a user verification sensor configured to identify a user identity and to selectively operate the lock to only allow an authorized user to transition the locking handle assembly from the closed position to the open position.

11. The system of claim 10, wherein the user verification sensor is a fingerprint sensor.

* * * * *